June 7, 1960   R. W. PARKER ET AL   2,939,717
READILY REMOVABLE DEBRIS RECEPTACLE FOR LAWN SWEEPER
Filed June 17, 1958   3 Sheets-Sheet 1
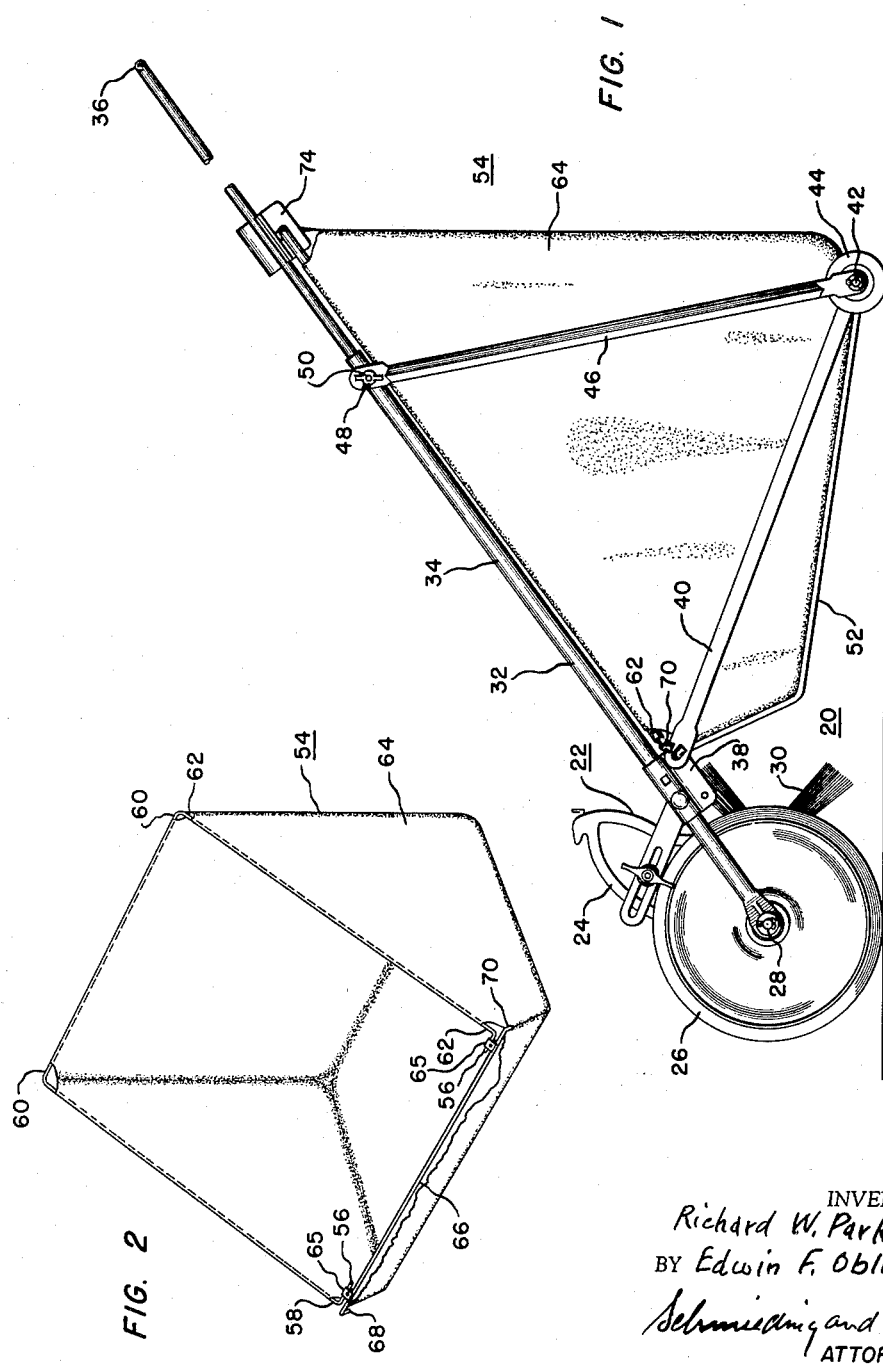
INVENTOR.
Richard W. Parker and
BY Edwin F. Oblinger
Schmieding and Fultz
ATTORNEYS

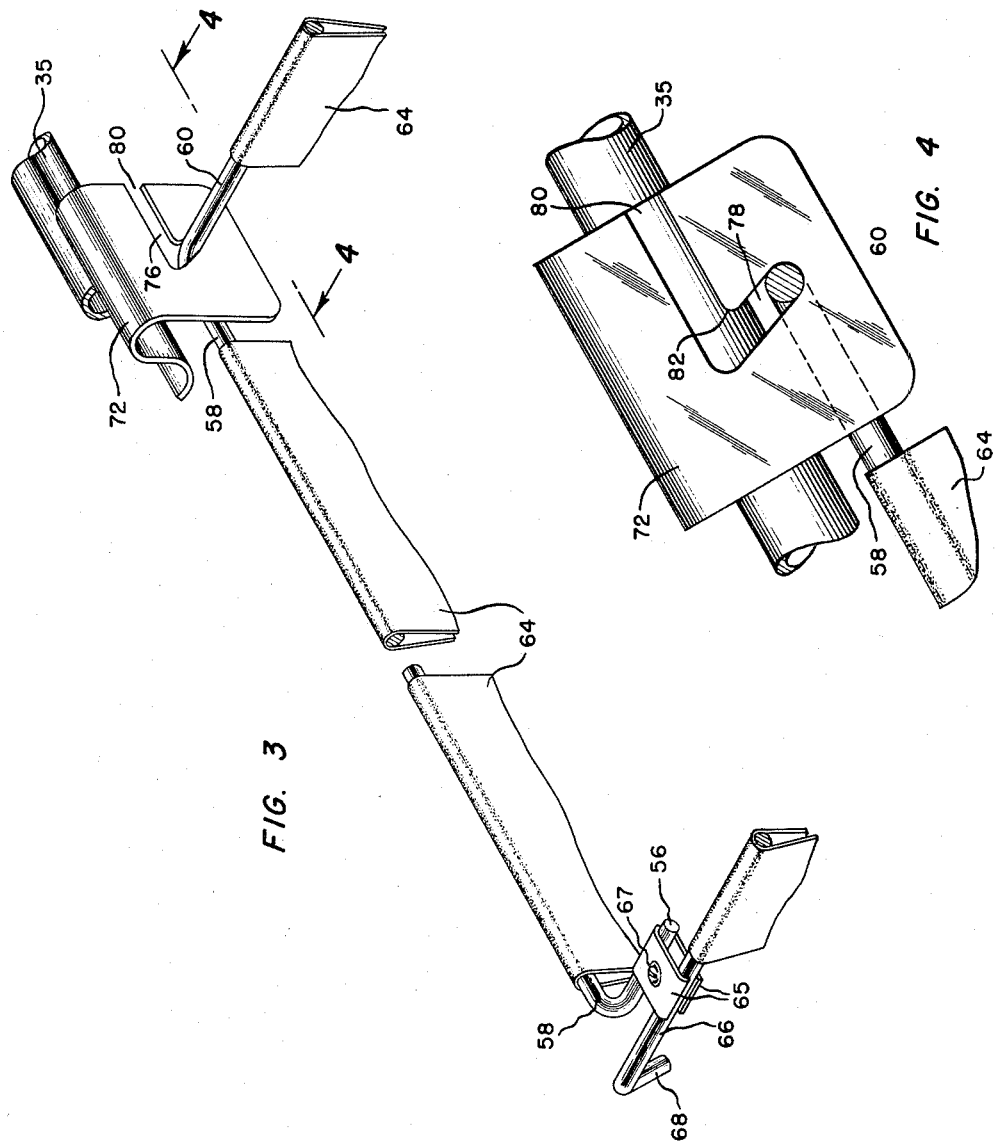

June 7, 1960   R. W. PARKER ET AL   2,939,717
READILY REMOVABLE DEBRIS RECEPTACLE FOR LAWN SWEEPER
Filed June 17, 1958   3 Sheets-Sheet 3

INVENTORS
RICHARD W. PARKER &
EDWIN F. OBLINGER
BY
Schmieding and Fultz
ATTORNEYS United States Patent Office 2,939,717
Patented June 7, 1960

2,939,717

READILY REMOVABLE DEBRIS RECEPTACLE FOR LAWN SWEEPER

Richard W. Parker and Edwin F. Oblinger, Springfield, Ohio, assignors to Parker Sweeper Company, Springfield, Ohio, a corporation of Ohio Filed June 17, 1958, Serial No. 742,619

5 Claims. (Cl. 280—47.26)

The present invention relates to machines such as sweepers or lawn mowers in combination with a debris receptacle or basket positioned rearwardly of the machine for catching the debris, such as dirt, leaves and sticks, when the machine is a sweeper, or for catching grass clippings when the machine is a mower.

The machine of the present invention includes the usual chassis of a lawn sweeper or lawn mower; it includes a rearwardly and upwardly extending handle by which the machine is manipulated, either by pushing the same by the handle or by guiding the same if the machine is driven by a motor. The machine also includes supporting structure for the rear of the handle and for debris basket.

This supporting structure includes two braces which extend rearwardly and form tracks for a shoe on the basket. In attaching the basket to the machine, the shoe of the basket is placed on the tracks and then moved forwardly to the desired position.

Fastening mechanism is formed on the upper rear of the basket and on the handle for latching the basket in position.

Further objects and advantages will be apparent from the following description, reference being had to the accompanying drawings wherein a preferred embodiment of the invention is illustrated.

In the drawings:

Fig. 1 is a left side view of the improved machine, the invention being illustrated in connection with a sweeper;

Fig. 2 is a perspective view of the debris basket, on a somewhat smaller scale;

Fig. 3 is a fragmentary view of the upper right side of the debris receptacle and the bracket forming one of the latching means for holding the basket in position; this bracket is normally attached to one of the handle bars, but part of the bar is omitted for the sake of clearness;

Fig. 4 is a fragmentary sectional view taken on line 4—4 of Fig. 3.

Figure 5:
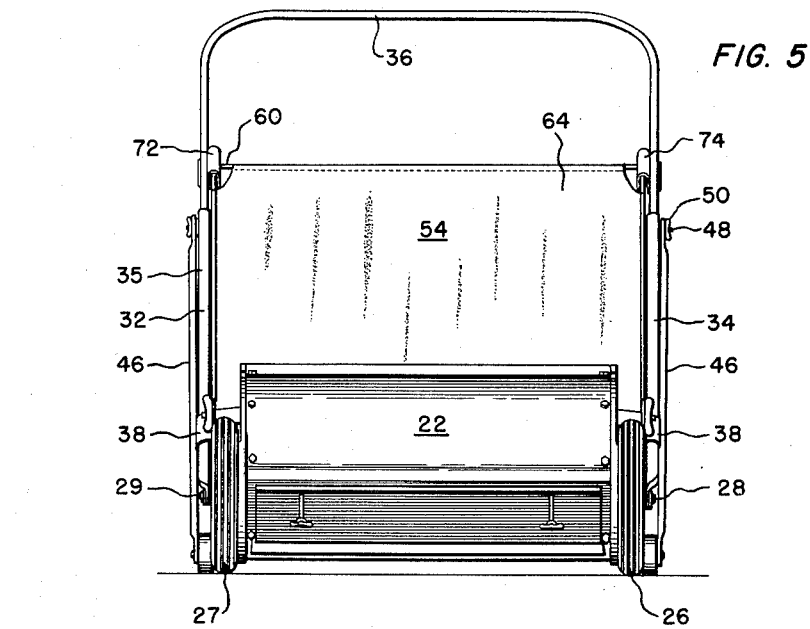
Fig. 5 is a front view of the sweeper—.
Figure 6:
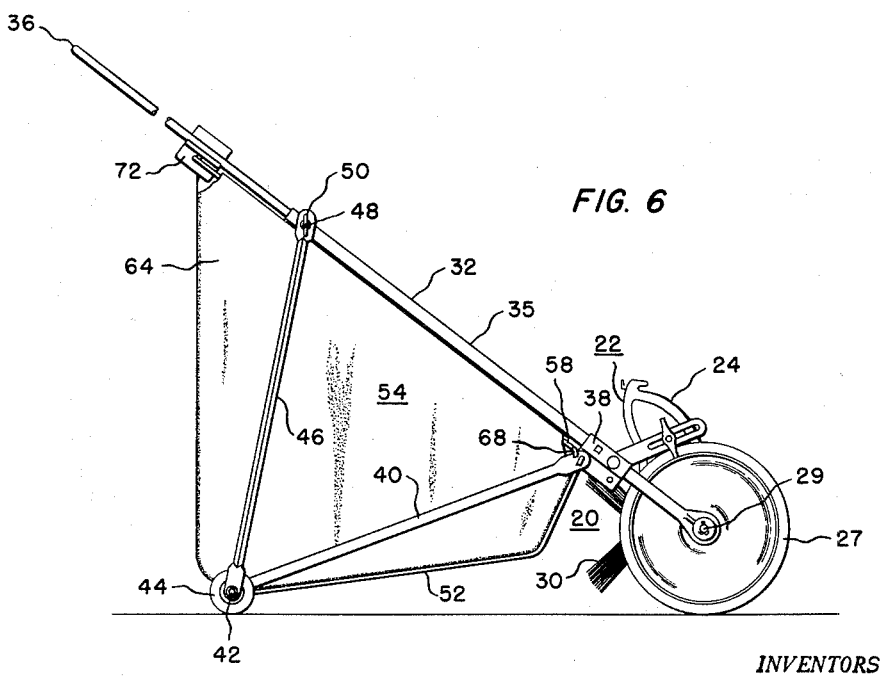
Fig. 6 is a right side view of the sweeper.

Referring more in detail to the drawings, the sweeper is substantially the same as that shown in the co-pending application of Richard W. Parker and Edwin F. Oblinger, Serial Number 603,855, filed July 12, 1956. The sweeper is shown generally at 20 and includes a main frame 22 including right and left side plates, the left side plate being shown at 24. Axle means are provided for axially aligned wheels, shown at 26 and 27, and the axle means therefor are shown at 28 and 29. A rotating brush 30 is driven by the machine, either through a gearing connected between the wheels 26 and the brush or a power operated motor, not shown.

The machine is manipulated by a handle 32, and it is to be understood that the word "manipulated" comprises either pushing the machine when the machine is hand operated or merely guiding the machine if it is power operated. The handle 32 is in the form of an inverted U having a left leg 34 which is suitably secured to the axle means 28, a similar leg 35 on the right side of the machine, and a cross-bar at the top indicated by the numeral 36. These legs 34 and 35 will be herein referred to as handle bars.

Lower brackets 38 are attached to each of the bars, the left bracket being shown at 38. Two braces are connected with the brackets 38 and extend rearwardly one from the left side of the machine and one from the right side of the machine, the left brace being shown at 40. These braces are connected with a rear axle 42 which carries left and right side rollers, the left roller being shown at 44. Left and right braces extend from the axle 42 to the handle bars 34 and 35, the left brace being shown at 46. The upper ends of the braces 46 are detachably connected to the handle bars 34 by bolts 48 and wing nuts 50. If desirable, a floor can be provided by sheet metal, one side edge only being shown at 52, where the same is bent back on itself for eliminating the sharp edge of the metal and for reinforcing the floor at the side edges.

The basket 54 comprises an upper rectangular framework formed of rod sections. The rod sections include lower end sections 56, right section 58, upper rear section 60 and left section 62. The cloth basket 64 is suspended from the rod framework. Another rod 66 is arranged parallelly of the lower rod sections 56 and is suitably attached thereto as by a clamp including jaws 65 and a bolt 67. This rod 66 extends outwardly of the sections 58 and 62 and then downwardly on the right side as at 68 and on the left side as at 70. This rod 66 functions as a shoe in that it is arranged to ride upon the top side of the braces 40, the braces 40 thus functioning as a track for guiding the forward and rearward movement of the basket when applying the basket to the machine and when removing the same from the machine. The portions 68 and 70 lie along the outside of the braces 40 and thereby guide the basket, i.e., prevent the basket from sliding sideways off of the braces 40.

The rear section 60 of the basket rod framework functions as one of the elements of a fastening means for the basket. The other elements comprise two brackets 72 and 74 shown more in detail in Figs. 3 and 4. The right bracket 72 is suitably attached to the handle bar 35 and the left bracket 74 is suitably attached to the handle bar 34. These brackets extend downwardly below the handle bars and each is provided with a slot including a forwardly extending section 76 and a downwardly and rearwardly extending section 78. In attaching the basket to the machine, as the rod or shoe 66 slides forwardly on the top of the braces 40, the rod section 60 is guided manually so that it enters the mouth 80 of the slot and the basket is forced forwardly far enough so that the rod clears the apexes 82 on the brackets 72 and 74 and then is forced downwardly to the position shown in Fig. 4. Thus it will be seen from the foregoing that the basket can be readily attached and readily removed from operative position. In detaching the basket, the operator need only lift upwardly on the rear section 60 of the basket and then pull rearwardly so that the section 60 clears the slot. At this time the shoe 66 will be riding upon the top of the guide braces 40. In inserting the basket in position the shoe 66 is placed upon the guide braces 40 and moved forwardly, the rod section 60 being guided so that it enters the mouths 80 of the brackets 72 and 74 and then pushed forwardly and downwardly as previously described.

While the form of embodiment herein shown and described constitutes a preferred form, it is to be understood that other forms may be adopted falling within the scope of the claims that follow.

We claim:

1. A machine of the character described, comprising in combination, chassis means including a frame, two axle means on the frame axially aligned with one another, a pair of wheels carried by the axle means, an upwardly and rearwardly extending handle means, for manipulating the chassis, attached to one of said means; a removable debris basket; and mechanism forming a rear support for the handle means and forming a carrier for the debris basket comprising two rearwardly extending side braces, means connecting the forward ends of the braces with one of the aforementioned means, and a brace operatively connected with the rear end of one of the side braces and with the handle means rearwardly of the connecting means, shoe means at the forward end of the basket and extending on opposite sides of the basket and having portions extending downwardly alongside the outer sides of said rearwardly extending braces, said shoe means being slidably carried on the rearwardly extending braces and providing the support for the front end of the basket, said basket including fastening means at the upper rear end thereof, and fastening means on the handle means cooperating with the fastening means on the basket.

2. A device of the character defined in claim 1 characterized in that the shoe means includes a rod carried by the basket and disposed transversely of the rearwardly extending braces and riding thereon.

3. A device of the character defined in claim 1, characterized in that the shoe means includes a rod carried by the basket and disposed transversely of the rearwardly extending braces and riding thereon, said rod including portions lying alongside of the rearwardly extending braces forming guides, guided by said braces.

4. A device of the character defined in claim 1, characterized in that the fastening means on the basket comprises a rod at the upper end of the basket extending transversely of the handle, and further characterized in that the fastening means on the handle means comprises means forming a forwardly extending slot for receiving the last mentioned rod.

5. A device of the character defined in claim 1, characterized in that the fastening means on the basket comprises a rod at the upper end of the basket extending transversely of the handle, and further characterized in that the fastening means on the handle means comprises means forming a slot having a forwardly portion, downwardly and then rearwardly extending portion for receiving the last mentioned rod.

References Cited in the file of this patent
UNITED STATES PATENTS

| | | |
|---|---|---|
| 1,917,782 | Vachon | July 11, 1933 |
| 2,191,601 | Wessock | Feb. 27, 1940 |
| 2,595,420 | Smola | May 6, 1952 |
| 2,654,106 | Parker | Oct. 6, 1953 |
| 2,727,265 | Dunham | Dec. 20, 1955 |
| 2,801,862 | Parker | Aug. 6, 1957 |